United States Patent [19]

Brunelle et al.

[11] Patent Number: 5,039,783
[45] Date of Patent: Aug. 13, 1991

[54] METHOD FOR PREPARING AND POLYMERIZING MACROCYCLIC POLY(ALKYLENE DISCARBOXYLATE) OLIGOMERS

[75] Inventors: Daniel J. Brunelle, Scotia; Jean E. Bradt, Esperance, both of N.Y.

[73] Assignee: General Electric Company, Schenectady, N.Y.

[21] Appl. No.: 608,767

[22] Filed: Nov. 5, 1990

[51] Int. Cl.$^5$ .................. C08G 63/78; C08G 63/82
[52] U.S. Cl. .................. 528/272; 528/274; 528/300; 528/308; 528/371; 528/372; 524/714; 524/720; 524/792
[58] Field of Search .............. 528/272, 274, 300, 308, 528/371, 372; 524/714, 720, 792

[56] References Cited

U.S. PATENT DOCUMENTS

| | | | |
|---|---|---|---|
| 4,163,097 | 7/1979 | Baumann et al. | 525/531 |
| 4,242,264 | 12/1980 | Zweifel et al. | 548/427 |
| 4,644,053 | 2/1987 | Brunelle et al. | 528/371 |
| 4,829,144 | 5/1989 | Brunelle et al. | 528/176 |

OTHER PUBLICATIONS

Wick et al., *Angew. Makromol. Chem.*, 112, 59–94 (1983) (Translated).
Ross et al., *J. Polymer Sci.*, 13, 406–407 (1954).
Goodman et al., *Polymer*, 1, 384–396 (1960).

*Primary Examiner*—John Kight, III
*Assistant Examiner*—Sam A. Acquah
*Attorney, Agent, or Firm*—William H. Pittman; James C. Davis, Jr.

[57] ABSTRACT

Macrocyclic polyester oligomer compositions comprising alkylene isophthalate or terephthalate units or the like are prepared by the reaction of a diol with a diacid chloride in the presence of at least one amine characterized by substantially no steric hindrance around the basic nitrogen atom. The reaction is conducted under substantially anhydrous conditions and at a temperature form about −25° to about +25° C. The resulting macrocyclic oligomers may be converted to linear polyesters by contact with catalysts including alkali metal salicylates, stannous alkoxides and organotin compounds.

15 Claims, No Drawings

METHOD FOR PREPARING AND POLYMERIZING MACROCYCLIC POLY(ALKYLENE DISCARBOXYLATE) OLIGOMERS

This invention relates to the preparation of macrocyclic polyester oligomer compositions, and more particularly to the preparation of macrocyclic poly(alkylene dicarboxylate) oligomers.

Linear polyesters such as poly(ethylene terephthalate) and poly(butylene terephthalate) are well known commercially available polymers having advantageous properties including solvent resistance. They are normally prepared by the reaction of a diol with a functional derivative of a dicarboxylic acid, typically a diacid halide or ester.

In recent years, various new methods for the preparation of linear condensation polymers have been developed which involve macrocyclic intermediates. For example, U.S. Pat. No. 4,644,053 discloses cyclic polycarbonate oligomer compositions which may be employed in reactive processing operations such as pultrusion, reaction injection molding and resin transfer molding, and thereby converted to linear polycarbonates of high molecular weight. Cyclic polyarylate compositions having similar capabilities are disclosed, for example, in U.S. Pat. No. 4,829,144.

There have been reports of the preparation of macrocyclic poly(alkylene dicarboxylates), particularly the isophthalates and terephthalates, by conventional reactions involving diols and dicarboxylic acid chlorides or dicarboxylic acid esters, but the yields were very low unless the reaction was carried in extremely high dilution, typically no higher than 0.001 M. Macrocyclic oligomers of this type have also been isolated from commercially available linear polyesters, again in very low yield. Reference is made, for example, to Wick et al., *Angew. Macromol. Chem.*, 112, 59–94 (1983); Ross et al., *J. Polymer Sci.* 13, 406–407 (1954); and Goodman et al., *Polymer*, 1, 384–396 (1960).

The present invention is based in part on the discovery of reaction conditions under which macrocyclic polyester oligomers of this type may be obtained in relatively high yields, typically 15–75%. The reaction employed is the condensation of a diol with a diacid chloride in the presence of a non-sterically hindered amine as catalyst, under anhydrous conditions and at relatively low temperatures.

Accordingly, one aspect of the invention is a method for preparing a macrocyclic polyester oligomer composition comprising structural units of the formula

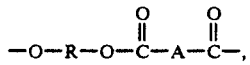

(I)

wherein R is an alkylene or mono- or polyoxyalkylene radical containing a straight chain of about 2–8 atoms and A is an m-or p-linked monocyclic aromatic or alicyclic radical, which comprises contacting at least one diol of the formula HO—R—OH and at least one diacid chloride of the formula

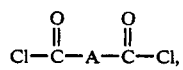

under substantially anhydrous conditions and in the presence of a substantially water-immiscible organic solvent, with at least one unhindered tertiary amine; said contact being conducted at a temperature from about −25° to about +25° C.

The diols employed in the method of this invention are characterized by the presence of an R value which may be an alkylene or mono- or polyoxyalkylene radical. Thus, alkylene glycols and polyalkylene glycols are included, provided the straight chain connecting the hydroxy groups contains about 2–8 atoms. Suitable alkylene glycols include ethylene glycol, propylene glycol, tetramethylene glycol, hexamethylene glycol and neopentylene glycol. Suitable polyalkylene glycols include diethylene glycol and triethylene glycol. Ethylene glycol and tetramethylene glycol are preferred.

The other reagent used to form the macrocyclic polyester oligomers is a diacid chloride containing an A value which may be an m- or p-linked monocyclic aromatic or alicyclic radical. Included are m- and p-phenylene, substituted derivatives thereof, and similarly structured cyclohexylene and cyclopentylene radicals. The m- and p-phenylene radicals, and especially p-phenylene, are preferred.

Also employed in the method of this invention is at least one unhindered tertiary amine and a substantially water-immiscible organic solvent. The essential feature of the amine is the lack of a substantial amount of steric hindrance around the basic nitrogen atom. Preferred amines of this type are polycyclic compounds with a tertiary nitrogen in the bridgehead position, as illustrated by quinuclidine and 1,4-diazabicyclo[2.2.2]octane (DABCO), which have the following formulas, respectively:

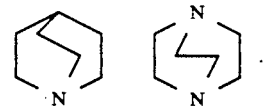

Also suitable, though less preferred because they produce the macrocyclic oligomers in lower yield, are N-methyl heterocyclic monoamines such as N-methylpyrrolidine and N-methylpiperidine, especially the former.

As organic solvents, various water-immiscible non-polar organic liquids may be employed Illustrative liquids of this type are aromatic hydrocarbons such as toluene and xylene; substituted aromatic hydrocarbons such as chlorobenzene, o-dichlorobenzene and nitrobenzene; and chlorinated aliphatic hydrocarbons such as chloroform, methylene chloride, trichloroethane and tetrachloroethane. Chlorinated aliphatic hydrocarbons are preferred, with methylene chloride frequently being most preferred because of its availability and particular suitability. It is frequently advantageous to employ, in combination with the water-immiscible solvent, a more polar combined oxygen-containing solvent such as tetrahydrofuran in which the diol is soluble to facilitate dissolution thereof.

The molar ratio of diol to diacid chloride is preferably about 1:1, although some variation (generally no more than about 5%) is permissible. Unlike the method for preparation of cyclic polyarylates described in the aforementioned U.S. Pat. No. 4,829,144, the present method requires that the amine be employed in amounts approximating those of the diol and diacid chloride combined, rather than in catalytic amounts. Formation of an acylammonium salt by reaction of the amine with the diacid chloride is apparently a step in the process. Typical molar ratios of amine to combination of diol and diacid chloride are in the range of about 1.0–1.5:1, with 1.25:1 frequently being preferred.

The proportion of solvent employed in the reaction is not critical. In general, highest yields are obtained at concentrations of diol and diacid chloride in the range of about 0.1–0.5 M.

The precise order of addition of reagents is not a critical aspect of the invention, except that the amine and diacid chloride should be prevented from coming into contact with each other prior to contact with the diol. This is necessary because the acylammonium salt which is thus formed undergoes nearly immediate decomposition by nucleophilic displacement of nitrogen from a carbon atom by the chloride ion also present in said salt.

Thus, it is within the scope of the invention to introduce the diol, diacid chloride and amine simultaneously into the reaction vessel, with the amine being introduced either separately or in admixture with the diol. It is also within the scope of the invention to introduce the diol and diacid chloride into the reaction vessel which already contains the amine, in which case the diol and diacid chloride may be introduced separately or in admixture.

It is essential that the reaction conditions be substantially anhydrous. The presence of an appreciable amount of water will cause hydrolysis of the diacid chloride or the acylammonium salt, to produce carboxylic acid which may then undergo dehydration to an anhydride. Such hydrolysis will naturally decrease the yield of cyclic polyester oligomer.

It is also essential to conduct the reaction at a temperature from about $-25°$ to about $+25°$ C., preferably from about $-25°$ to about $5°$ C. and most preferably from about $-10°$ to $0°$ C. At temperatures below about $-25°$ C., the process becomes impractical by reason of an extremely low reaction rate. At temperatures above about $+25°$ C., side reactions predominate; they may include decomposition of the acylammonium salt and reaction of the amine with chlorinated aliphatic hydrocarbon used as solvent, to form quaternary ammonium salts. Yields are maximized at temperatures no higher than about $5°$ C.

When the solvent is a chlorinated aliphatic hydrocarbon or similar material containing highly nucleophilic substituents, reaction with the amine may be relatively rapid at temperatures above about $5°$ C. Under such conditions, it will generally be advisable to introduce the diol, diacid chloride and amine simultaneously as previously described, so as to ensure contact between the amine and diacid chloride before the former comes into possible reactive contact with the solvent Following the reaction between the diacid chloride and diol, it is generally necessary to remove linear polyester in the form of oligomers and high polymer. The high polymer portion of the linears is insoluble in the solvents employed, and may be removed by filtration. Linear oligomers are most conveniently removed by column chromatography through silica gel or the like. Following the removal of high polymer and linear oligomers, the solvent may be removed and the cyclic oligomers recovered in substantially pure form.

The compositions prepared by the method of this invention are mixtures of macrocyclic polyester oligomers, usually having degrees of polymerization from 2 to about 12. They usually comprise predominantly dimer, trimer, tetramer and pentamer.

Structural identification of the cyclic polyester oligomers prepared by the method of this invention was made by comparison with authentic samples isolated from commercially available linear polyesters. Thus, extraction of a commercial sample of poly(butylene terephthalate) with hot dioxane yielded about 1% by weight of a pale yellow semisolid, from which linear oligomers were removed by flash chromatography over silica gel Medium pressure liquid chromatography was then employed to isolate the cyclic dimer, trimer, tetramer, pentamer and hexamer from the remaining mixture.

The cyclic polyester oligomers prepared by the method of this invention may be converted to linear polyesters by contact with a macrocyclic polyester oligomer polymerization catalyst, typically in the amount of about 0.01–2.0 and preferably about 0.05–0.5 mole percent, at a temperature within the range of about 200°–300° C. The resulting polymers generally have weight average molecular weights in the range of about 10,000–100,000. This method of conversion to linear polyesters is another aspect of the invention.

Macrocyclic polyester oligomer polymerization catalysts include alkali metal salicylates, stannous alkoxides and organotin compounds. Illustrative salicylates are lithium salicylate, sodium salicylate and potassium salicylate, with lithium salicylate generally being preferred. Illustrative stannous alkoxides are the methoxide, ethoxide and propoxides. Illustrative organotin compounds are dialkyltin(IV) oxides such as di-n-butyltin-(IV) oxide and di-n-octyltin oxide and acyclic and cyclic dialkyltin(IV) dialkoxides such as di-n-butyltin(IV) di-n-butoxide and 2,2-di-n-butyl-2-stanna-1,3-dioxacycloheptane.

The invention is illustrated by the following examples. All percentages are by weight.

EXAMPLES 1–10

A three-necked round-bottomed flask fitted with a mechanical stirrer, nitrogen purge and septum for reagent addition was charged with 100 ml. of methylene chloride and 5.6 grams (50 mmol.) of an amine as specified hereinafter. The mixture was cooled to 0° C. and there were separately added in a nitrogen atmosphere over 30 minutes, with stirring, solutions of 20 mmol. of various diols in tetrahydrofuran and solutions of 20 mmol. of isophthaloyl or terephthaloyl chloride in 10 ml. of methylene chloride. Stirring was continued for 5 minutes after addition was completed, and then 2 ml. of methanol was added to quench the reaction. Stirring was resumed for 5 minutes, after which 50 ml. of 1 M aqueous hydrochloric acid solution was added, following by another 5 minutes of stirring. The organic and aqueous layers were separated and the aqueous layer was extracted with an additional 50 ml. of methylene chloride. The combined organic solutions were filtered using a filter aid material when necessary, washed with dilute aqueous hydrochloric acid solution and aqueous sodium chloride solution, and evaporated to dryness. The products were purified by flash chromatography over silica gel, using 1–2% acetone solutions in methylene chloride as the eluant, followed by evaporation of the solvent.

The products were the desired macrocyclic polyester oligomer compositions. Molecular structures were proved by infrared and proton nuclear magnetic resonance spectroscopy and comparison with known macrocyclic oligomers.

The macrocyclic poly(butylene isophthalate) oligomer compositions began to melt at 110° C., flowed freely at 185° C. and were completely molten at 200° C. The corresponding poly(butylene terephthalate) compositions began to melt at 140° C. and became a freely flowing liquid at 190° C.

Further details are given in Tables I and II. In Table II, the amine employed in each example was DABCO. "HPLC yield" is the crude yield determined by high pressure liquid chromatography, without calibration; the lack of calibration is in part responsible for the fact that HPLC yield is sometimes lower than "isolated yield". The latter is the yield of pure cyclics obtained after column chromatography. The designation "M" for tetrahydrofuran in Table I indicates that the minimum amount required for dissolution of the diol was employed.

TABLE I

|  | Example | | | | | |
|---|---|---|---|---|---|---|
|  | 1 | 2 | 3 | 4 | 5 | 6 |
| Diacid chloride: | | | | | | |
| Isophthaloyl | X | — | X | X | X | — |
| Terephthaloyl | — | X | — | — | — | X |
| Diol: | | | | | | |
| Ethylene glycol | X | X | — | — | — | — |
| Tetramethylene glycol | — | — | X | X | — | — |
| Hexamethylene glycol | — | — | — | — | X | X |
| Amine: | | | | | | |
| Quinuclidine | — | — | X | — | — | — |
| DABCO | X | X | — | X | X | X |
| Tetrahydrofuran, ml. | 10 | 10 | M | M | 10 | 10 |
| HPLC yield, % | 112 | 82 | 64 | 70 | 110 | 102 |
| Isolated yield, % | — | — | 50 | 63 | 55 | — |

TABLE II

|  | Example | | | |
|---|---|---|---|---|
|  | 7 | 8 | 9 | 10 |
| Diacid chloride: | | | | |
| Isophthaloyl | X | — | X | — |
| Terephthaloyl | — | X | — | X |
| Diol: | | | | |
| Neopentylene glycol | X | X | — | — |
| Diethylene glycol | — | — | X | X |
| HPLC yield, % | 89 | 101 | 117 | 84 |
| Isolated yield, % | 54 | — | 53 | 49 |

EXAMPLES 11–15

The procedure of Examples 1–10 was repeated using tetramethylene glycol as the diol, with the exception that a single solution in tetrahydrofuran of diol and diacid chloride was introduced. The results are given in Table III.

TABLE III

|  | Example | | | | |
|---|---|---|---|---|---|
|  | 11 | 12 | 13 | 14 | 15 |
| Diacid chloride: | | | | | |
| Isophthaloyl | X | X | X | — | — |
| Terephthaloyl | — | — | — | X | X |
| Amine: | | | | | |
| Quinuclidine | — | X | — | X | — |
| DABCO | X | — | — | — | X |
| N-Methylpyrrolidine | — | — | X | — | — |
| HPLC yield, % | 30 | 30 | 20 | — | 48 |

EXAMPLES 16–18

The procedure of Examples 1–10 was repeated employing tetramethylene glycol as the diol and quinuclidine as the amine, except that the diol and amine were both dissolved in tetrahydrofuran and the solution thus obtained was introduced simultaneously with a solution of the diacid chloride in methylene chloride to the reaction vessel containing only methylene chloride. The results are given in Table IV.

TABLE IV

|  | Example | | |
|---|---|---|---|
|  | 16 | 17 | 18 |
| Diacid chloride: | | | |
| Isophthaloyl | — | X | — |
| Terephthaloyl | X | — | X |
| HPLC yield, % | 65 | 65 | 57 |
| Isolated yield, % | — | 32 | 17 |

EXAMPLE 19–21

The procedure of Examples 16–18 was repeated, except that the amount of tetrahydrofuran employed was the minimum amount needed to dissolve the diol and amine. The results are given in Table V.

TABLE V

|  | Example | | |
|---|---|---|---|
|  | 19 | 20 | 21 |
| Amine: | | | |
| N-Methylpyrrolidine | X | — | — |
| DABCO | — | — | X |
| Quinuclidine | — | X | — |
| HPLC yield, % | 63 | 73 | 70 |
| Isolated yield, % | 58 | 60 | 66 |

EXAMPLES 22–25

The procedure of Examples 1–10 was repeated employing tetramethylene glycol as the diol and DABCO as the amine, except that 20 ml. of methylene chloride was employed to dissolve the diacid chloride. In Example 24, 1% excess tetramethylene glycol was employed. The results are given in Table VI.

TABLE VI

|  | Example | | | |
|---|---|---|---|---|
|  | 22 | 23 | 24 | 25 |
| Diacid chloride: | | | | |
| Isophthaloyl | — | X | X | — |
| Terephthaloyl | X | — | — | X |
| HPLC yield, % | 47 | 67 | 53 | 56 |
| Isolated yield, % | 66 | 82 | 72 | 75 |

EXAMPLE 26

Samples of macrocyclic poly(butylene isophthalate) oligomers were intimately blended with 1.0 mole percent of various catalysts and converted to linear polyesters by heating for 15 minutes at various temperatures. The results are given in Table VII.

TABLE VII

| Catalyst | Temperature, °C. | Linear polyester Percent | Mw |
|---|---|---|---|
| Lithium salicylate | 250 | 16 | 17,500 |
| " | 275 | 51 | 39,700 |
| Di-n-butyltin oxide | 200 | 51 | 68,100 |
| " | 250 | 86 | 65,700 |
| " | 275 | 90 | 42,100* |
| Di-n-octyltin oxide | 200 | 49 | 53,200 |
| " | 250 | 93 | 61,500 |
| " | 275 | 88 | 43,000 |
| Stannous methoxide | 250 | 54 | 36,000 |
| " | 275 | 72 | 31,300 |
| Stannous ethoxide | 250 | 59 | 37,500 |
| " | 275 | 79 | 35,600 |
| Di-n-butyltin di-n-butoxide | 200 | 95 | 63,100 |
| " | 250 | 90 | 33,300 |
| " | 275 | 96 | 34,200 |
| 2,2-Di-n-butyl-2-stanna-1,3-dioxacycloheptane | 200 | 56 | 55,000 |
| 2,2-Di-n-butyl-2-stanna-1,3-dioxacycloheptane | 250 | 76 | 38,900 |
| 2,2-Di-n-butyl-2-stanna-1,3-dioxacycloheptane | 275 | 97 | 45,300 |

*4% gel also formed.

What is claimed is:

1. A method for preparing a macrocyclic polyester oligomer composition comprising structural units of the formula

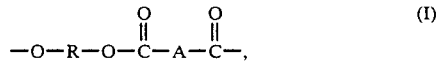

$$-O-R-O-\overset{O}{\underset{\|}{C}}-A-\overset{O}{\underset{\|}{C}}-, \quad (I)$$

wherein R is an alkylene or mono- or polyoxyalkylene radical containing a straight chain of about 2–8 atoms and A is an m-or p-linked monocyclic aromatic or alicyclic radical, which comprises contacting at least one diol of the formula HO—R—OH and at least one diacid chloride of the formula

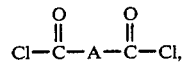

$$Cl-\overset{O}{\underset{\|}{C}}-A-\overset{O}{\underset{\|}{C}}-Cl,$$

under substantially anhydrous conditions and in the presence of a substantially water-immiscible organic solvent, with at least one unhindered tertiary amine; said contact being conducted at a temperature from about −25° to about +25° C.

2. A method according to claim 1 wherein the molar ratio of diol to diacid chloride is about 1:1 and the molar ratio of amine to combination of diol and diacid chloride is in the range of about 1.0–1.5:1.

3. A method according to claim 2 wherein the amine and diacid chloride are prevented from coming into contact with each other prior to contact with the diol.

4. A method according to claim 3 wherein the solvent is a chlorinated aliphatic hydrocarbon and the temperature is from about −25° to about 5° C.

5. A method according to claim 4 wherein the diacid chloride is isophthaloyl or terephthaloyl chloride.

6. A method according to claim 5 wherein the amine is diazabicyclo[2.2.2]octane, quinuclidine or N-methylpyrrolidine.

7. A method according to claim 6 wherein the diol is ethylene glycol, propylene glycol, tetramethylene glycol, hexamethylene glycol, neopentylene glycol or diethylene glycol.

8. A method according to claim 7 wherein the solvent is methylene chloride.

9. A method according to claim 7 wherein the diol is ethylene glycol.

10. A method according to claim 7 wherein the diol is tetramethylene glycol.

11. A method according to claim 7 wherein the amine is diazabicyclo[2.2.2]octane.

12. A method according to claim 7 wherein the amine is quinuclidine.

13. A method according to claim 7 wherein the amine is N-methylpyrrolidine.

14. A method according to claim 7 wherein the diacid chloride is isophthaloyl chloride.

15. A method according to claim 7 wherein the diacid chloride is terephthaloyl chloride.

* * * * *